United States Patent [19]

Nelson

[11] Patent Number: 4,721,582

[45] Date of Patent: Jan. 26, 1988

[54] TOXIC GAS ABSORBENT AND PROCESSES FOR MAKING SAME

[75] Inventor: Sidney G. Nelson, Hudson, Ohio

[73] Assignee: Sanitech, Inc., Twinsburg, Ohio

[21] Appl. No.: 10,449

[22] Filed: Feb. 3, 1987

Related U.S. Application Data

[63] Continuation-in-part of Ser. No. 838,354, Mar. 11, 1986, abandoned.

[51] Int. Cl.$^4$ ............................. C09K 3/00; B01J 20/04
[52] U.S. Cl. ................................. 252/189; 252/378 P; 252/378 R; 502/410; 502/515; 502/517
[58] Field of Search ................... 252/189, 192, 378 P, 252/378 R; 502/406, 410, 515, 517

[56] References Cited

U.S. PATENT DOCUMENTS

| | | | |
|---|---|---|---|
| 1,934,242 | 11/1933 | Smyly | 252/191 |
| 1,976,806 | 10/1934 | Rosen et al. | 423/244 |
| 2,904,424 | 9/1959 | Chapman, Jr. et al. | 71/52 |
| 2,957,828 | 10/1960 | Mansfield | 252/194 |
| 2,967,153 | 1/1961 | Houston | 252/194 |
| 3,284,209 | 11/1966 | Kelley | 426/549 |
| 3,492,083 | 1/1970 | Lowicki et al. | 423/244 |
| 3,579,293 | 5/1971 | Shultz et al. | 423/231 |
| 3,839,227 | 10/1974 | Schlaefer et al. | 502/241 |
| 3,882,221 | 5/1975 | Wilson | 423/244 |
| 3,895,088 | 7/1975 | Goksel | 264/82 |
| 3,959,440 | 5/1976 | Mizuno et al. | 423/239 |
| 3,983,218 | 9/1976 | Heins | 423/244 |
| 4,025,604 | 5/1977 | Moriguchi et al. | 423/239 |
| 4,061,476 | 12/1977 | Hölter et al. | 423/239 X |
| 4,201,751 | 5/1980 | Holter et al. | 502/405 |
| 4,206,186 | 6/1980 | Hölter et al. | 423/239 X |
| 4,324,838 | 4/1982 | Ballard et al. | 428/402 |
| 4,525,388 | 6/1985 | Render et al. | 252/378 P X |
| 4,539,046 | 9/1985 | McAloon et al. | 106/121 |

Primary Examiner—Matthew A. Thexton
Attorney, Agent, or Firm—Watts, Hoffmann, Fisher & Heinke Co.

[57] ABSTRACT

Solid sorbents (acceptors) for noxious components, e.g. $SO_x$, $NO_x$ and HX, from gases below about 250°, specifically acceptors that contain hydrated divalent metal oxide coated onto an exfoliated or expanded mineral support, are improved by heating them before use at a temperature of 450°–650° for a conditioning period of at least a few minutes. So conditioned pulverulent MgO coated onto water-laden exfoliated vermiculite (alternatively expanded perlite) is preferred because of capacity and the ability of the magnesia-based acceptors to be regenerated at a moderately elevated temperature that precludes substantial deterioration of acceptor or equipment. To insure immediate activity the conditioned acceptor is moistened for use. Advantageously the gas and/or the acceptor is humidified during their contact.

13 Claims, No Drawings

TOXIC GAS ABSORBENT AND PROCESSES FOR MAKING SAME

RELATED APPLICATION

This application is a continuation-in-part of applicant's copending application Ser. No. 838,354 filed on Mar. 11, 1986, now abandoned, entitled *Material and Process for Gas Desulfurization*. The teachings of that specification are incorporated herein expressly by reference.

TECHNICAL FIELD

This invention relates to solid sorbent materials ("acceptors") for use in removing ("accepting") sulfur oxides, nitrogen oxides ($NO_x$), hydrogen halides and/or other noxious components, (eg. hydrogen sulfide, carbonyl sulfide, sulfur trioxide, etc.) from a gas, particularly a waste gas stream, and to improvements in process for making, using and regenerating the acceptors. Of these contaminants the ones specially targetted here are $SO_2$ and $NO_x$ (typified by $NO_2$) as they as the most common and usually most difficult to remove virtually completely amongst those above specified.

BACKGROUND ART

Flue or vent gases from the combustion of fuels such as coal or residual oil, the pyrolysis of solid waste, and the venting of chemical processes has been a matter of increasing concern for many years. Components such as sulfur dioxide and nitrogen oxides ($NO_x$) are accused of fostering acid rain, having toxic effect on human, lower animal and plant life, and being generally dangerous or obnoxious even in quite low concentrations.

As a result, many approaches have been proposed to cleanse the waste gases of their toxic components. Scrubbing with a compound in slurry form with water has been by far the most popular approach. Wet scrubbing systems, although effective in removing toxic gases, have been very expensive and highly corrosive and have often simply converted an air-pollution problem into a sludge-disposal or water-pollution problem. Even with wet scrubbing processes involving reactants that are regenerable, thus producing no waste sludge, problems have occurred. In the magnesium oxide wet scrubbing process, for example, major technical difficulties have been encountered in handling the corrosive liquid slurries, and large energy costs have been incurred in drying the slurries and in regenerating the magnesium oxide.

In recent years several so-called dry sorbent processes have been proposed. In these processes particulate reactant is brought into direct contact with the undesirable components of a waste gas stream where it reacts with those components in a dry or semi-dry state. Principal advantages of these processes have been their simplicity, decreased mechanical problems, and generally lower costs. A major disadvantage has been their low cleansing efficiencies; at best generally only 50 to 60 percent of the toxic components are removed.

Various approaches have been examined in an attempt to increase the reactivity and cleansing efficiency of particulate reactants. One such approach involves the use of silicate particles having a huge surface area, e.g., asbestos, exfoliated vermiculite, or expanded (popped) perlite.

Thus, U.S. Pat. No. 4,061,476 teaches that expanded perlite optionally is added to a solid absorbent. Pulverulent amorphous silicon dioxide, charcoal, carbon dust, lime hydrate, bog iron ore, pulverulent iron oxide, and dolomite dust are taught as being useful solids called variously "absorption" or "sorption" agents or "absorbents". Popped perlite is stated to have good physical absorption properties and is suitable for supplying water to the reaction; alternatively the gas in process can be humidified.

U.S. Pat. No. 4,201,751 to the same inventors teaches use of exfoliated vermiculite and expanded perlite, suitably moistened with water and caustic soda, as a carrier for a sprayed-on aqueous suspension of absorption agent. Such agent is rich in ferric oxide-containing still mill dust; higher alkalinity is imparted to the suspension by dispersing calcium hydroxide and/or calcium oxide therein; the further mixing in of bog iron ore and/or a heavy metal salt such as one of lead or copper is stated to improve the sorption of various acidic gases. Line-alkalized steel mill dust on an expanded perlite carrier is exemplified for treating contaminated gas. When the absorption agent becomes exhausted by contact with $SO_2$, it can be roasted to drive off $SO_2$ with preservation of the perlite. Perlite does not tend to sinter until above 980°.

An earlier patent, U.S. Pat. No. 3,882,221, appears to prefer aqueous caustic soda or potash solutions coated onto exfoliated vermiculite or expanded perlite for gas cleaning purposes. However, this patent exemplifies wetting one or the other of these two expanded minerals with an aqueous dispersion of calcium oxide and of calcium hydroxide to coat such carrier, then reacting the coatings with chlorine and carbon dioxide gases, respectively. Details of the preparation and operating efficiency of these chalky coatings are not evident from the text, and their effectiveness for removing $SO_2$ and $NO_x$ only can be speculated on. The reaction products obtained are stated as being capable of being removed from the expanded mineral with water or other unnamed suitable solvent.

It has now been discovered that exfoliated or expanded minerals, such as vermiculite or perlite, freshly coated with a hydrated divalent metal oxide, can be conditioned in a simple manner to produce an improved acceptor for cleansing waste gases at temperatures below 250°. Complete and efficient removal of mixed $SO_2$ and $NO_2$ has been obtained consistently when using gases with contaminant concentrations representative of those in waste gases, such as a flue gas from the combustion of coal. Furthermore, an improved coating method has been devised for obtaining very high, waste-free loading of MgO and CaO on the exfoliated or expanded mineral for extended sorption service. The conditioning method has been found to result in an interaction between the MgO or CaO and the mineral carrier that results in a strong bond between the phases. Also, the conditioning has been found to increase markedly the strength of the carrier, resulting in significantly less degradation in handling. Additionally, the magnesium oxide embodiment of the improved acceptor has been found, surprisingly, to be repeatedly regenerable without noticeable degradation at a much lower temperature than related prior art acceptors, and that regeneration can be practiced efficiently in a manner that allows the simultaneous removal and separate collection or destruction of $SO_2$ and $NO_x$ when these gases have been sorbed together.

BROAD STATE OF THE INVENTION

I have found, surprisingly, that a solid acceptor for removal of noxious components from gas at temperature below 250°, which acceptor is particulate exfoliated or expanded mineral support coated with hydrated divalent metal oxide, can be demonstrably improved for the accepting purpose by a mild, short term, heat treatment of such hydrous association of oxide and support before its use. The heating is for at least a few minutes at a temperature substantially above that of normal use, i.e., at a hypernormal temperature such as 450°-650°. For brevity I refer to the operation as one of "conditioning", and the improved acceptor as one that has been "conditioned" for the accepting purpose. Obtaining very high useful loadings of metal oxide such as MgO and CaO on the support involves saturating or nearly saturating the porous support with water, and then applying the oxide in an ostensibly dry, pulverulent condition to the wet support while the latter is being agitated. Thus loaded, the material can be conditioned by the mild, short term heat treatment.

Regeneration of the improved magnesia acceptor that has become laden with contaminant gas can be accomplished by simply heating the acceptor to conditioning temperature and maintaining it there until the sorbed gases (or their gasiform derivatives) are substantially expelled from the acceptor. With this procedure, $SO_2$, $NO_x$ and HCl can be desorbed from the acceptor. This relatively low temperature thermal regeneration can be performed in the presence of a gasiform reducing agent such as methane, if desired.

BEST MODE FOR CARRYING OUT THE INVENTION

Advantageous metal oxides for the instant sorption purpose are MgO, CaO, ZnO and CuO, preferably MgO and CaO, and most preferably MgO. These oxides need not be of high purity. Use of technical or agricultural grades and even much lower grades is satisfactory. Carbonate contamination can be expected in some magnesias and calcium oxides, particularly if they have been stored for long times with no special precautions. For the present purposes, magnesium carbonate presents no difficulties because it decomposes to MgO at the modest conditioning temperatures. Calcium and dolomitic carbonates, on the other hand, do not decompose appreciably if at all at the conditioning temperatures. While it is possible to substitute here calcium hydroxide for some or all of the CaO and magnesium hydroxide for some or all of the MgO, this could result in reduced sorption capacity per unit weight of the divalent metal equivalent applied, hence is less favored than use of the oxides.

Various methods of contacting the contaminated gas with the acceptor can be practiced. The preferred way involves passing such gas through one or more static or agitated beds of the improved acceptor particles, then directing the cleansed gas to a stack. The gas can be passed upwardly, downwardly, or in a cross flow direction with respect to the bed. The bed can be vertical, horizontal, raked or rabbled, and it can be static, slowly moving downwardly or horizontally, bubbling or in fluid motion.

Alternatively, acceptor particles can be injected into a waste gas flowing through a duct and turbulently entrained with the gas and finally collected as a bed on a screen or fabric filter. In such instances, however, it is probably desirable to maintain a modest sized bed of particles (at least several inches deep) on the screen or filter to bring about longer and probably more thorough contact between the absorbent and the gas.

The use of moving beds or a dry injection system has the advantage of permitting separated, laden acceptor to be continuously drawn off, regenerated, and recycled for reuse. This can be particularly practical when using the present MgO acceptor embodiment where regeneration can be done at a low temperature. Efficient fixed bed practice often involves the use of two or more beds, each used and regenerated in an appropriate sequence.

Characteristically, as a bed of the instant improved acceptor cleanses the incoming gas of $SO_2$, $NO_x$ and/or HCl, an advancing "front" (interface) between the virtually spent acceptor and the more active acceptor travels through the bed in the direction of gas flow. This occurrence is especially and advantageously evident when a toxic gas such as $SO_2$ is being sorbed by the present MgO acceptor embodiment with perlite as the mineral carrier. In this case, the normally snow white particles turn bright yellow as the bed becomes saturated and the front moves through the bed.

In the case of a fixed bed, when or just before some preselected value such as 50 percent of the contaminating gases are noted as passing through and out from the filter bed without reacting, the gas flow can be switched to a fresher bed. In the case of moving beds, the beds can be continuously or intermittently augmented with active acceptor material, usually with some withdrawal of spent material. Advantageously the gas and/or the acceptor is humidified for the sorption operation unless the gas already holds considerable water.

Conditioning of the instant, freshly made acceptor is relatively simple. It is accomplished by heating the acceptor in air (or other gas not appreciably reactive with the acceptor) at temperature above 400°, and preferably at 450° to 550° for at least a few minutes, advantageously 15 or more minutes, and preferably for 20 minutes. The heating can be done in a furnace, kiln, or the like, or in situ at the gas cleansing location. Conditioning for $\frac{1}{2}$-1 hour or even longer does not appear to harm the acceptor; it just costs more.

The solid acceptor of the present invention preferably is prepared by first weighing out a given quantity of mineral carrier, and then mixing it with a weighed quantity of water wherein the weight ratio of water to dry mineral carrier does not exceed about 4:1 and no free or standing water exists after mixing. A weighed quantity of dry divalent metal oxide, in powder form (preferably passing through 28 mesh Tyler Standard sieve) is then sifted into the wet carrier as the latter is stirred slowly and continuously. The quantity of oxide blended into the mixture can vary, but should not exceed an amount that is equivalent to a weight ratio of about 60:40 of dry oxide to dry carrier. If a weight ratio higher than about 60:40 is used, generally a significant number of unattached oxide particles tend to exist in the final acceptor material.

Mixing can be performed manually or mechanically by using any one of a number of commercially available mixers or slow blenders. Manual or mechanical mixing with the aforementioned procedures has been found to result in an oxide phase uniformly distributed on the mineral carrier, in few or no free (unattached) oxide particles, and in no significant bonding together of coated mineral carrier particles; they remain discrete. The moist acceptor particles advantageously are then permitted to air dry for a period of 30 minutes or more, after which time they are relatively free flowing and are ready for conditioning.

For conditioning, the acceptor will usually contain a significant amount of water. The porous acceptor (exfoliated vermiculite or expanded perlite) acts as a very effective reservoir for water, allowing small quantities of water to escape and to react with oxide particles attached to the acceptor forming hydroxides. The water used can, if desired, by made slightly alkaline with the addition of caustic soda, ammonia or the like or slightly acid with the addition of an acid such as sulfuric acid before mixing. However, such alkalinizing or acidifying steps are generally not needed.

During drying and conditioning at 400° to 650°, particularly useful cracks, fissures, and pores in the oxide coating are formed and are opened up as a result of the rapidly escaping water and the high temperatures. Conceivably this occurrence may be partially responsible for the markedly improved effectiveness of conditioned absorbent over absorbent with no conditioning.

After the acceptor material is employed to remove $SO_2$, $NO_x$, etc. from a waste gas stream and approaches becoming saturated with such contaminants, the contaminants can be expelled from the acceptor by heating it. The instant magnesia acceptor embodiment actually can be regenerated repeatedly at conditioning temperature. An advantageous regeneration temperature range for the magnesia acceptor is 450° to 650°; the required time for complete regeneration decreases with an increase in temperature. Higher temperatures, therefore, favor shorter regeneration times. Higher temperatures, however, often mean higher energy costs, and heating the spent acceptor substantially above 650°, e.g. 900° or above, can result in noticeable structural degradation of the acceptor. A satisfactory and economical and therefore preferred regeneration temperature and time for the magnesium acceptor is 600° and 20 minutes, respectively. During regeneration, after an initial emission of moisture which principally comes off at temperatures slightly above 100°, $SO_2$, $NO_x$, HCl or other gases captured during absorption are released. Recovered $SO_2$ can be purified and liquified to provide a valuable, marketable by-product. It is used in sewage treatment, sulfuric acid manufacture, the brewing and has many other applications.

The rate and extent of regeneration can be improved by providing the spent sorbent with a reducing environment during heating. Small quantities of methane, CO or elemental hydrogen added to the atmosphere of the regeneration unit provide such an environment. The use of methane is particularly attractive when $NO_2$ is present in the gas being recovered from the acceptor. Methane will react with the $NO_2$, resulting in $CO_2$, $H_2O$ and nitrogen, all relatively innocuous species that can be dealt with readily in recovery processing.

The following examples summarize the preparation of and various tests performed in connection with the improved acceptor, but should not be construed as limiting the invention. In this specification all parts are weight parts, all gas compositions are by volume, and all temperatures are in degrees Celsius unless otherwise expressly noted.

For the following tests the exfoliated vermiculite support particles (approximately 0.1–0.25" in their largest dimension) were coated as follows: 200 parts of water were soaked up by 60 parts of such vermiculite at room temperature, about 22°. This was short of saturation. The wet mixture then was stirred while 60 parts of dry powdered metal oxide was fed gradually onto the support phase and picked up by it to make a mass of discrete, pourable but unconditioned particles.

The coated expanded perlite was made as follows: 74 parts of water were soaked up by 45 parts of such perlite (of approximately the same size as the vermiculite above) at room temperature. This was short of saturation. The wet mixture then was stirred while 60 parts of dry powdered metal oxide was fed gradually onto the support phase and picked up by it to make a mass of discrete, pourable but unconditioned particles.

Of the metal oxides used, the calcium oxide, magnesium oxide, and dolomitic lime ($CaMgO_2$) were of technical grade, and the copper oxide was obtained from waste cupric hydroxide sludge by heating and grinding. All oxides were screened through a 28-mesh Tyler Standard sieve before being applied to the carrier materials. The conditioned acceptors were moistened with several drops of water before use, but the unconditioned (air dried) acceptors were not so moistened.

The test gases of known compositions were prepared by a commercial vendor. They were saturated with water by bubbling them through boiling water at atmospheric pressure, then conducted downflow through small fixed beds of the test acceptor. Gas rates were reckoned at room temperature and one atmosphere total pressure. No significant pressure drop was noted across filter beds during runs involving the improved acceptors. From the examples it can be seen that the terms "activated", "potentiated" or "capacitated" could be used as an alternative to the term "conditioned".

EXAMPLE 1

Two 20-gram quantities of acceptor (MgO coated onto exfoliated vermiculite) were conditioned by heating each at 550° for 30 minutes, then cooled and moistened. Two other like batches simply were air dried for 2 hours. All were tested with a gas stream flowing at two liters per minute and containing 931 ppm of $NO_2$, 210 ppm of NO, and the balance nitrogen. The $NO_2$ removal even after two hours was extremely high for the conditioned acceptors and essentially zero for the unconditioned ones. About half of the NO was removed by the conditioned acceptors while significantly less NO was removed by the unconditioned ones.

The tests are summarized below; they demonstrate that conditioning definitely improves sorptive performance of the acceptor.

TABLE I

| | $NO_2$ Removal Efficiency, Percent | | |
|---|---|---|---|
| Acceptor | After 2 min. | After 10 min. | After 120 min. |
| Unconditioned #1 | 67.8 | 46.3 | 0 |
| Unconditioned #2 | 66.7 | 35.6 | 0 |
| Conditioned #1 | 100.0 | 97.3 | 87.1 |
| Conditioned #2 | 100.0 | 97.9 | 87.1 |

EXAMPLE 2

Unconditioned acceptors were made from: (a) exfoliated vermiculite and magnesium oxide: (b) expanded perlite and magnesium oxide; and (c) exfoliated vermiculite and calcined dolomite. After being air-dried for three hours these acceptors were separated onto duplicate batches. One batch of each material was exposed directly to a five liter per minute sulfur dioxide-containing flue gas stream for 80 minutes. Its corresponding second batch, after being given a conditioning treatment consisting of heating to 450° for 30 minutes, cooling, and moistening with a few drops of water, was likewise exposed to a five liter per minute sulfur dioxide-containing flue gas. The composition of the flue gas was: 20.18% carbon dioxide; 4.04% oxygen, 0.33% sulfur dioxide; and balance nitrogen. The results of these runs, shown in Table II, indicate the improved effectiveness of conditioned material over non-conditioned material for removing sulfur dioxide from a sulfur dioxide-containing gas.

TABLE II

| Acceptor | SO$_2$ Removal Efficiency, Percent | | |
|---|---|---|---|
| | After 2 min. | After 50 min. | After 80 min. |
| Vermiculite + MgO Not Conditioned | 100 | 0 | 0 |
| Vermiculite + MgO Conditioned | 100 | 86.4 | 57.6 |
| Perlite + MgO Not Conditioned | 99.7 | 0 | 0 |
| Perlite + MgO Conditioned | 100 | 99.4 | 75.8 |
| Vermiculite + CaMgO$_2$ Not Conditioned | 100 | 63.6 | 0 |
| Vermiculite + CaMgO$_2$ Conditioned | 99.8 | 69.7 | 0 |

EXAMPLE 3

Small (5–8 gram) beds of magnesia-based acceptors were conditioned, cooled, moistened with a few drops of water, and used to sorb a particular contaminant from a stream of nitrogen flowing at 2 liters per minute. When they were practically saturated with contaminant, the beds were regenerated by heating to drive off the contaminant, then recooled, remoistened and reused to sorb more of the contaminant. In two of the cases below three successive sorption cycles were run with first and second regenerations after the first and second sorption cycles.

In the case of HCl sorption the heating steps for conditioning and for regeneration were at 550° for 20 minutes; in the cases of SO$_2$ and NO$_2$ sorption, such heatings were at 60° for 20 minutes. The results of these gas filtering experiments are tabulated below. The consistency in the time of breakthrough for 50% contaminant concentration of the gas indicates an excellent low-temperature regenerability that is substantially non-destructive to the acceptor.

TABLE III

| Filter Material | Contaminate Removed | Initial Conc. to Bed, ppm (Volume parts) | Initial Conc. out Bed, ppm (Volume parts) | Time at 50% Breakthrough (minutes) |
|---|---|---|---|---|
| Vermiculite + MgO | | | | |
| First Use | SO$_2$ | 3100 | 0 | 65 |
| After first Reg'n | SO$_2$ | 3100 | 0 | 60 |
| After 2nd Reg'n | SO$_2$ | 3100 | 0 | 59 |
| Perlite + MgO | | | | |
| First Use | NO$_2$ | 930 | 0 | 15 |
| After Reg'n | NO$_2$ | 930 | 0 | 37 |
| Vermiculite + MgO | | | | |
| First Use | HCl | 45,900 | 0 | 33 |
| After first | HCl | 45,900 | 0 | 33 |

TABLE III-continued

| Filter Material | Contaminate Removed | Initial Conc. to Bed, ppm (Volume parts) | Initial Conc. out Bed, ppm (Volume parts) | Time at 50% Breakthrough (minutes) |
|---|---|---|---|---|
| Reg'n After 2nd Reg'n | HCl | 45,900 | 0 | 32 |

EXAMPLE 4

A series of filtering runs was carried out wherein the performances of inventive filters made with magnesium oxide, calcium oxide, copper oxide or calcined dolomite coated onto exfoliated vermiculite or expanded perlite were compared with the performances of filters of straight exfoliated vermiculite, expanded perlite, magnesium oxide and calcium oxide. Each filter bed was 2.25 inches in diameter and about 5 inches long except the ones made with cupric oxide which were 1 inch in diameter and 3 inches long. The beds were exposed to the water-saturated simulated flue gas streams indicated in Table IV. The inventive filters were conditioned by heating at 450°–550° for 15–30 minutes. The vermiculite and perlite beds when used alone showed no ability to remove sulfur dioxide. The straight magnesium oxide and calcium oxide beds initially removed sulfur dioxide, but rapidly developed a mud-like nature that stopped gas flow. All inventive filters captured sulfur dioxide effectively with no appreciable pressure changes across the bed during runs. The results of these runs are summarized in Table IV.

TABLE IV

| Filter Material | Gas Flow L/min. | Feed Gas SO$_2$ Conc. ppm | SO$_2$ Conc. out from Filter, ppm, after 1 min. | Time, min., of 50% Breakthrough |
|---|---|---|---|---|
| Vermiculite | 1 | 500 | 500 | 0 |
| Perlite | 1 | 500 | 500 | 0 |
| MgO | 1 | 1000 | 0 | Clogged in 20 |
| CaO | 1 | 1000 | 0 | Clogged in 15 |
| MgO + Vermiculite | 1 | 1000 | 0 | 3000 |
| MgO + Vermiculite | 10 | 3200 | 1 | 420 |
| CaMgO$_2$ + Vermiculite | 1 | 1000 | 0 | 2300 |
| CaO + Vermiculite | 1 | 3100 | 0 | 750 |
| CaO + Perlite | 2 | 3100 | 0 | 590 |
| CuO + Vermiculite | 1 | 3300 | 10 | 25 |
| CuO + Perlite | 1 | 3300 | 150 | 22 |

Many modifications and variations of the invention will be apparent to those skilled in the art in the light of the foregoing detailed disclosure. Therefore, it is to be understood that, within the scope of the appended claims, the invention can be practiced otherwise than as shown and described.

I claim:

1. A solid acceptor for sulfur oxides, nitrogen oxides, hydrogen halides, and/or other noxious components of a gas at temperature below 250° C. wherein water-moistened exfoliated or expanded mineral support particles are coated with a divalent metal oxide or hydroxide, the support being selected from the group consisting of exfoliated vermiculite and expanded perlite, said acceptor being characterized by the coated support particles' having been heated before use at a temperature of least about 400° until conditioned for the accepting purpose.

2. The acceptor of claim 1 that has been conditioned by heating at a temperature of 450°–650° C.

3. The acceptor of claim 1 wherein the coating comprises particulate MgO and water.

4. The solid acceptor of claim 3 in regenerated condition, said solid acceptor having become laden with contaminant gas and subsequently unburdened of same by heating the laden acceptor at a temperature of at least about 450° C. until the contaminant gas therein and/or its gasiform derivatives had been substantially expelled from the acceptor.

5. The acceptor of claim 4 wherein the heating had been done in the presence of gaseous reducing agent.

6. The acceptor of claim 5 wherein the reducing agent comprised methane.

7. The acceptor of claim 1 wherein the coating comprises particulate CaO and water.

8. A regenerable solid acceptor for sulfur oxides, nitrogen oxides, hydrogen halides, and/or other noxious components of a gas at a normal treating temperature below 250° C., said acceptor being the dehydration product at a temperature of at least about 400° C. of pulverulent magnesia applied to water-laden exfoliated vermiculite particles.

9. In a process for preparing a solid acceptor for sulfur oxides, nitrogen oxides, hydrogen halides, and/or other noxious components from a gas at temperature below 250° C. wherein water-moistened exfoliated or expanded mineral support particles are coated with divalent metal oxide or hydroxide, the support particles being selected from the group consisting of exfoliated vermiculite and expanded perlite, the improvement which comprises:

heating the coated support particles prior to their initial use to a temperature of at least about 400° C. until they become conditioned for the accepting purpose.

10. The process of claim 9 wherein said heating is at least at about 450° for about 5 minutes to an hour.

11. The process of claim 9 wherein pulverulent CaO or MgO is applied to said mineral support that is nearly or totally saturated with water.

12. The process of claim 11 wherein the application is made in a proportion of about 50–110 parts of CaO or MgO per 100 parts (dry weight basis) of the support.

13. The process of claim 9 wherein pulverulent MgO is applied to said support.

* * * * *